Dec. 11, 1962   W. H. JACKSON ETAL   3,067,696
VARIABLE TRANSFER MECHANISM FOR CONVEYING APPARATUS
Filed Aug. 24, 1960   8 Sheets-Sheet 2

INVENTORS.
William H. Jackson
Raymond J. Winter
BY
Harness, Dickey & Pierce
ATTORNEYS

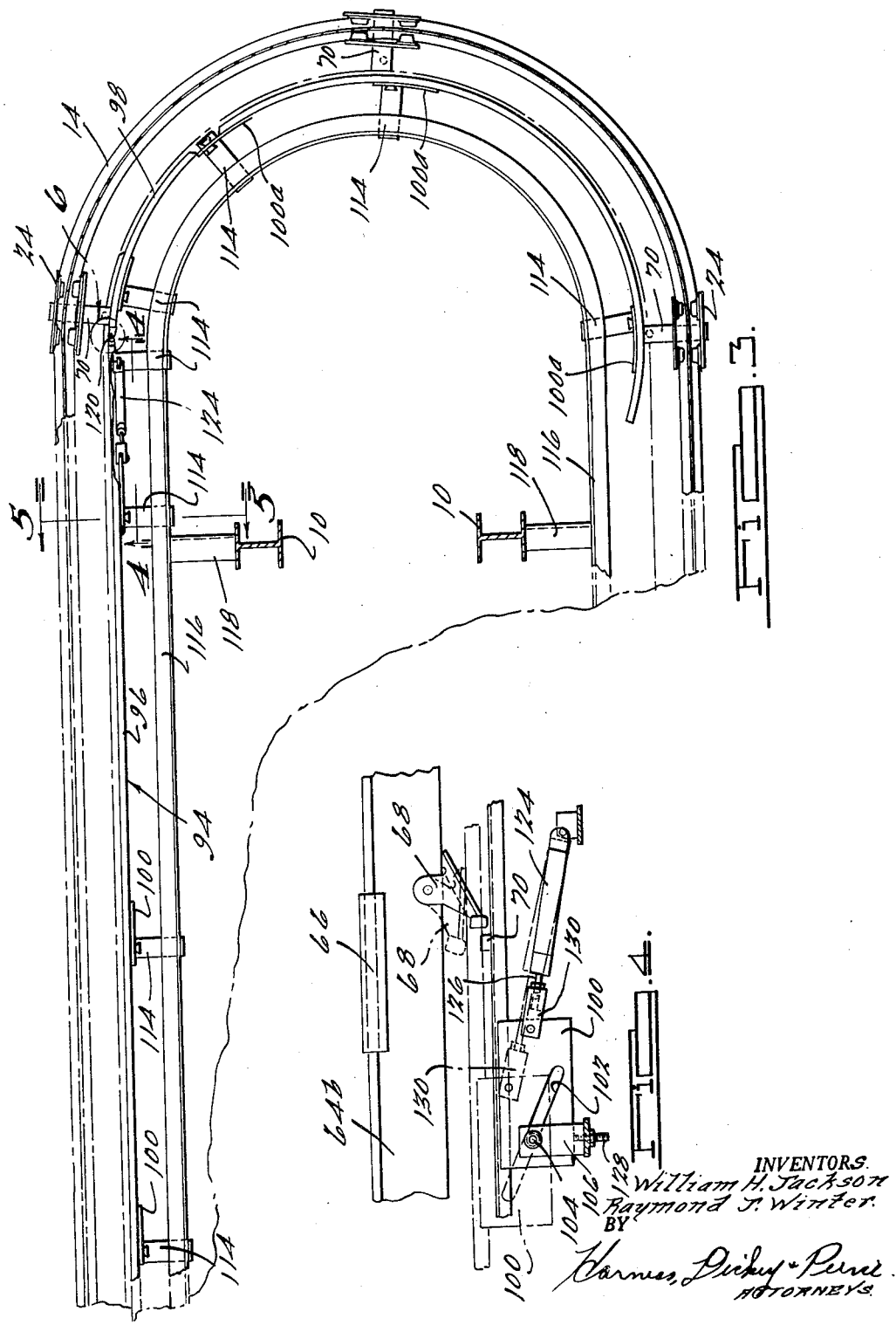

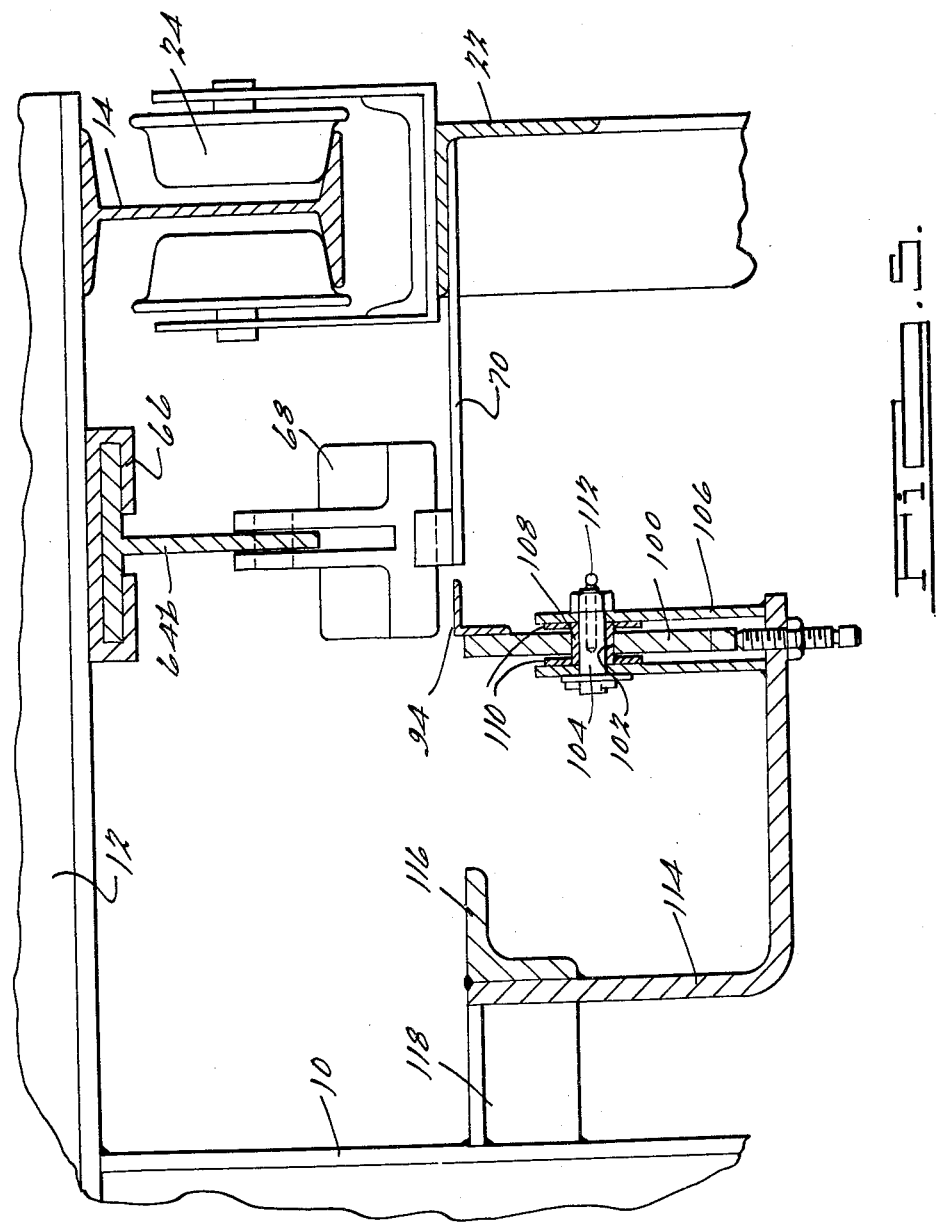

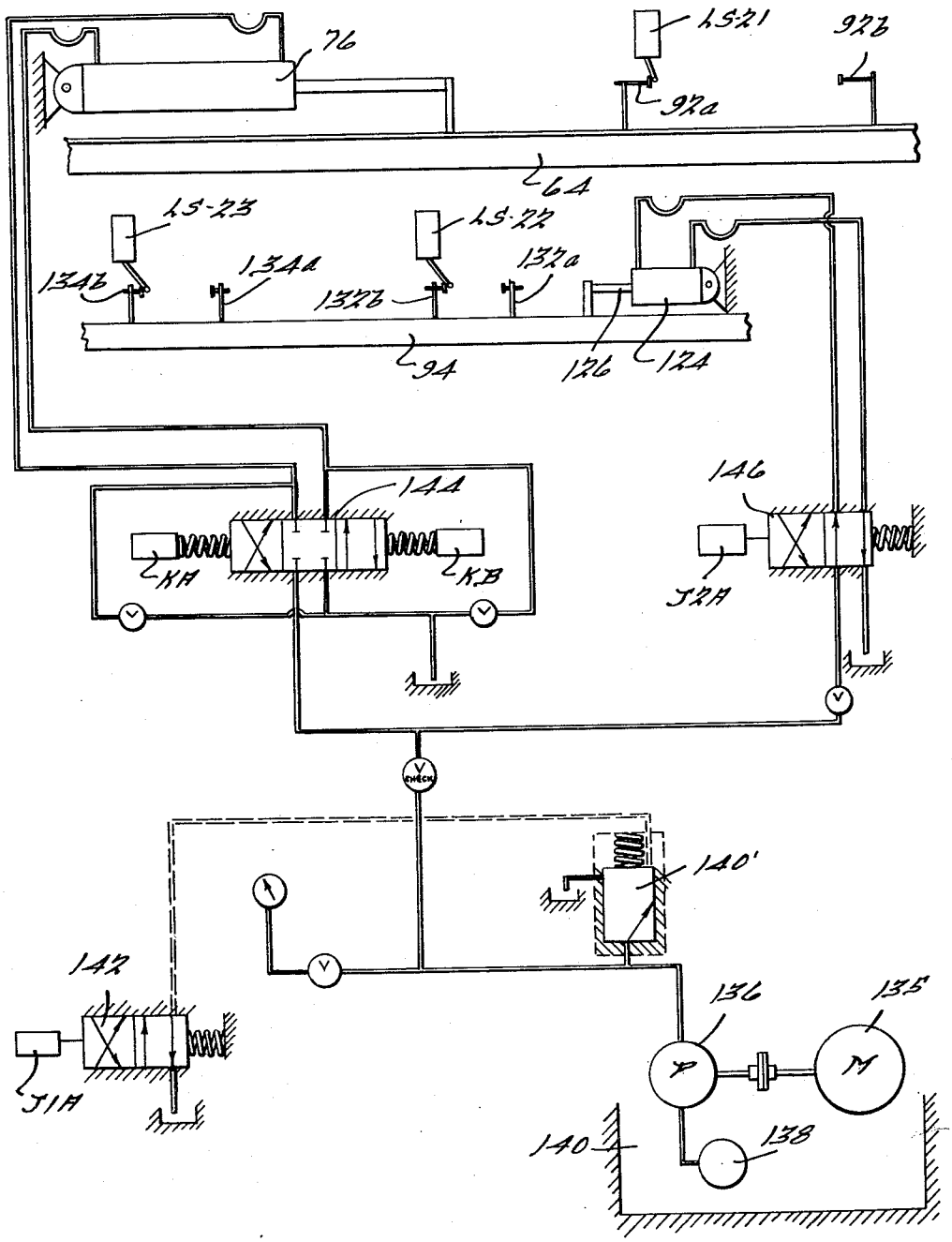

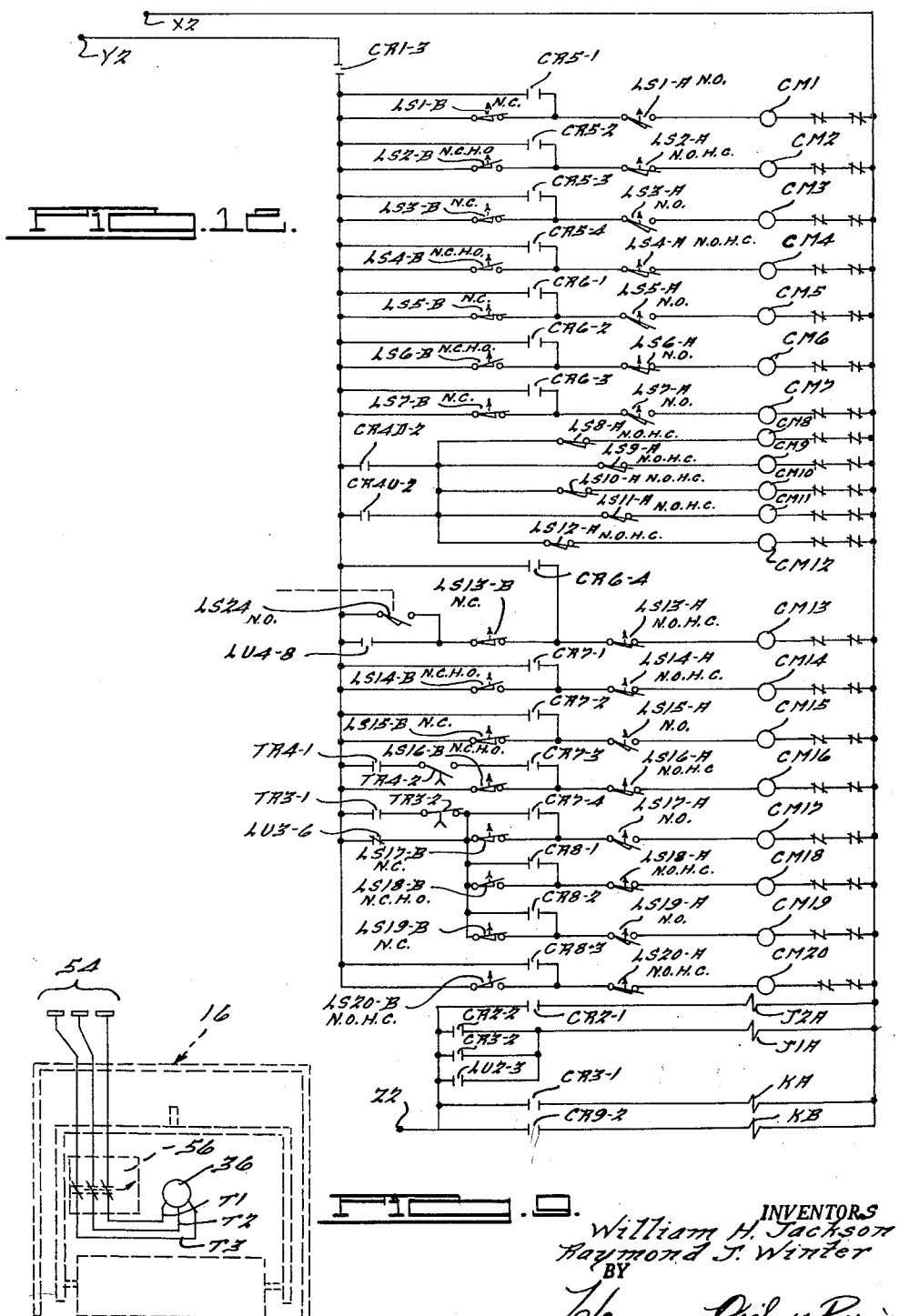

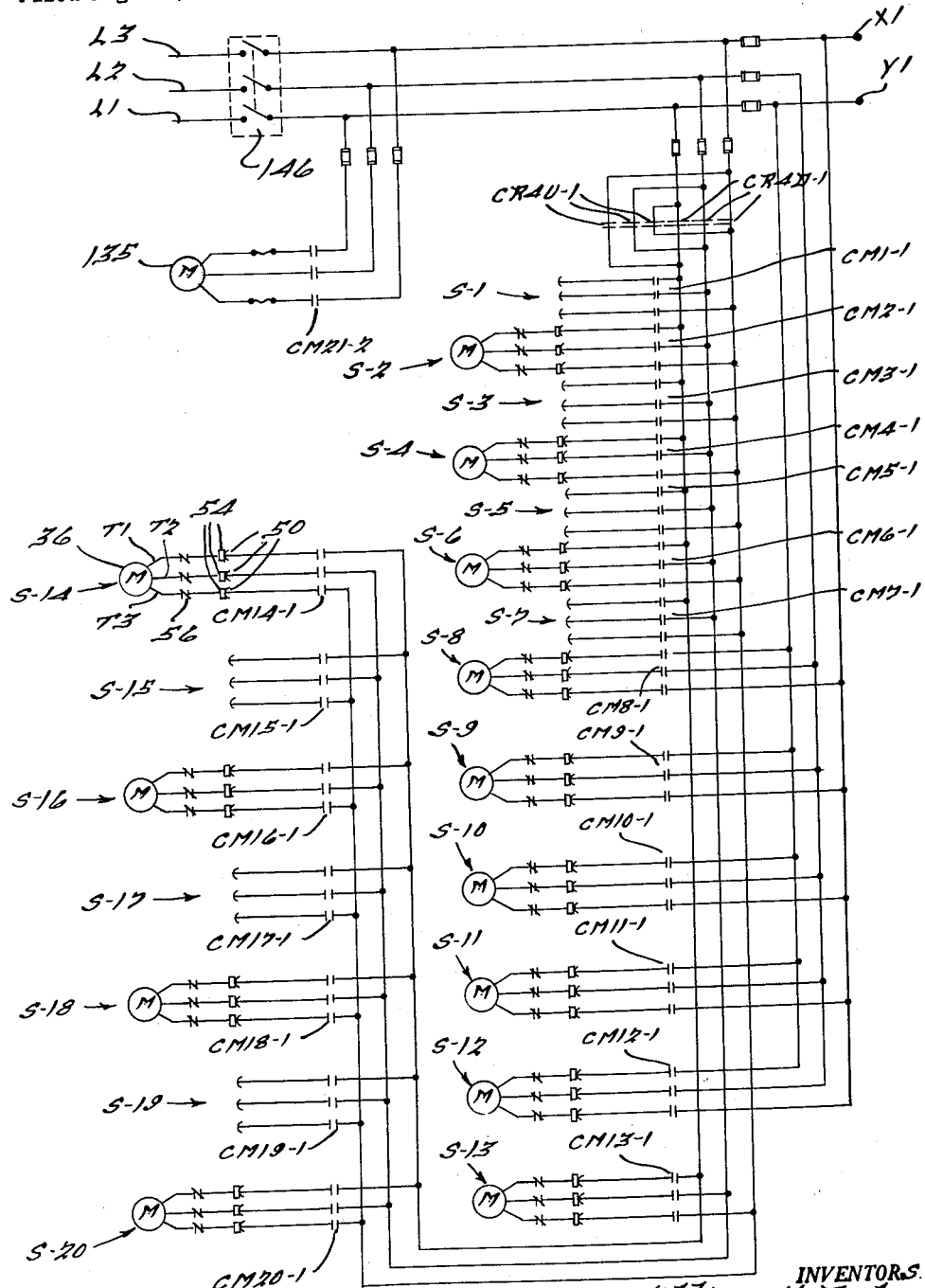

United States Patent Office 3,067,696
Patented Dec. 11, 1962

1

3,067,696
VARIABLE TRANSFER MECHANISM FOR
CONVEYING APPARATUS
William H. Jackson, Birmingham, and Raymond J. Winter, Allen Park, Mich., assignors to The Udylite Corporation, Detroit, Mich., a corporation of Delaware
Filed Aug. 24, 1960, Ser. No. 51,652
6 Claims. (Cl. 104—162)

The present invention broadly pertains to conveying apparatus of the type adapted to transfer workpieces through a series of treating stations, and more particularly, to a conveying machine incorporating a variable transfer mechanism whereby the rate at which the workpieces are advanced can be varied along different sections of the conveying machine.

There are two basic considerations involved in the sequential processing of workpieces through a series of treating stations by automated conveying machines. The first of these considerations relates to the physical size of the work supporting means including the workpieces which are suspended or otherwise supported thereon during their travel through the treating stations and which physical size establishes the minimum size of each of the treating stations in order to adequately accommodate the workpieces and assure satisfactory treatment thereof. The second consideration relates to the duration of treatment of the workpieces at each of the treating stations. Conventional electro-chemical treating processes such as, for example, an electroplating operation, frequently incorporate a cleaning phase through which the workpieces are transferred prior to the electro-chemical treating phase and which is subsequently followed by a series of finishing treatments such as rinsing and drying of the treated parts. The cleaning and finishing phases generally comprise a series of relatively short duration treatments whereas the electro-chemical treating phase comprises a comparatively long duration processing step of a predetermined time interval.

Because of the short treating duration of the workpieces in the cleaning and finishing phases, the work racks can be rapidly transferred through these stations. On the other hand, the comparatively long duration treatment of the workpieces in the electro-chemical treating phase permits the work racks to be transferred relatively slowly through these stations. In conveying machines having a uniform transfer rate along the entire length thereof the rapid transfer of the work racks through the cleaning and finishing phases results in a correspondingly rapid transfer of the work racks through the electro-chemical treating phase necessitating an exceedingly long length of electro-chemical treating receptacles in order to obtain the requisite treatment time. Alternatively, the transfer rate of a machine can be reduced to provide for optimum operation along the electro-chemical treating section which results in an excessively long duration treatment in the cleaning and finishing phases which frequently has an adverse effect upon the workpieces and additionally requires an excessive number of work carriers. In order to overcome these problems it has heretofore been the practice to rapidly transfer the work carriers manually through the cleaning and finishing stations and automatically transfer the work carriers along the electro-chemical treating stations at the optimum rate. This practice has the inherent disadvantage of a semiautomatic operation resulting in variations in the cleaning and finishing treatments of successive workpieces coupled with an inefficient utilization of manpower and equipment.

2

It is accordingly, an object of the present invention to provide a variable transfer mechanism for conveying apparatus which enables the rate of transfer of the work carriers to be varied along selected treating sections to achieve a fully automatic treating cycle which provides for optimum efficiency in the utilization of equipment, manpower and plant space.

Another object of this invention is to provide an improved transfer mechanism for conveying apparatus incorpating therein means for rendering selected portions of the transfer means inoperative and which means can be readily installed and integrated with the operating sequence of the conveying apparatus.

Still another object of this invention is to provide a variable transfer mechanism for conveying apparatus that is of simple design, durable construction and operation, and of economical manufacture.

A further object of this invention is to provide control means which alternatively stop the operation of the machine or provide for continuous automatic operation in the event a work carrier inadvertently becomes positioned in the improper sequence.

The foregoing and and other objects of this invention are achieved by incorporating in the transfer mechanism of a conveying machine disenabling means which are disposed adjacent to selected ones of the engaging pushers on the transfer mechanism and which disenabling means are effective when automatically moved from an inoperative to an operative position to coact with and position the selected ones of the engaging pushers in an inoperative position wherein they do not engage and advance the work carriers adjacent thereto during selected advancing movement of the transfer mechanism.

Other objects and advantages of the present invention will become apparent from the following detailed description taken in conjunction with the accompanying drawings, wherein:

FIG. 3 is a fragmentary plan view of one end of the conveying machine shown in FIGURE 1 and incorporating thereon a trip mechanism constructed in accordance with the preferred embodiments of this invention;

FIG. 4 is a fragmentary longitudinal vertical sectional view of the trip cylinder and trip bar of the trip mechanism shown in FIG. 3 and taken along the line 4—4 thereof;

FIG. 5 is a transverse vertical sectional view through the trip mechanism and transfer mechanism shown in FIG. 3 and taken along the line 5—5 thereof;

FIG. 6 is an enlarged fragmentary plan view of the hinge connection between the arcuate trip bar section and straight trip bar section which is shown in the circled area of FIG. 3 and generally indicated at 6;

FIG. 7 is a fragmentary side elevation view of the hinge connection shown in FIG. 6;

FIG. 8 is a diagrammatic view of the hydraulic system of the conveying machine;

FIG. 9 is a schematic wiring diagram of a typical barrel type work carrier; and

FIGS. 10 to 12 are wiring diagrams of the control circuit of the conveying machine.

Figure 1:
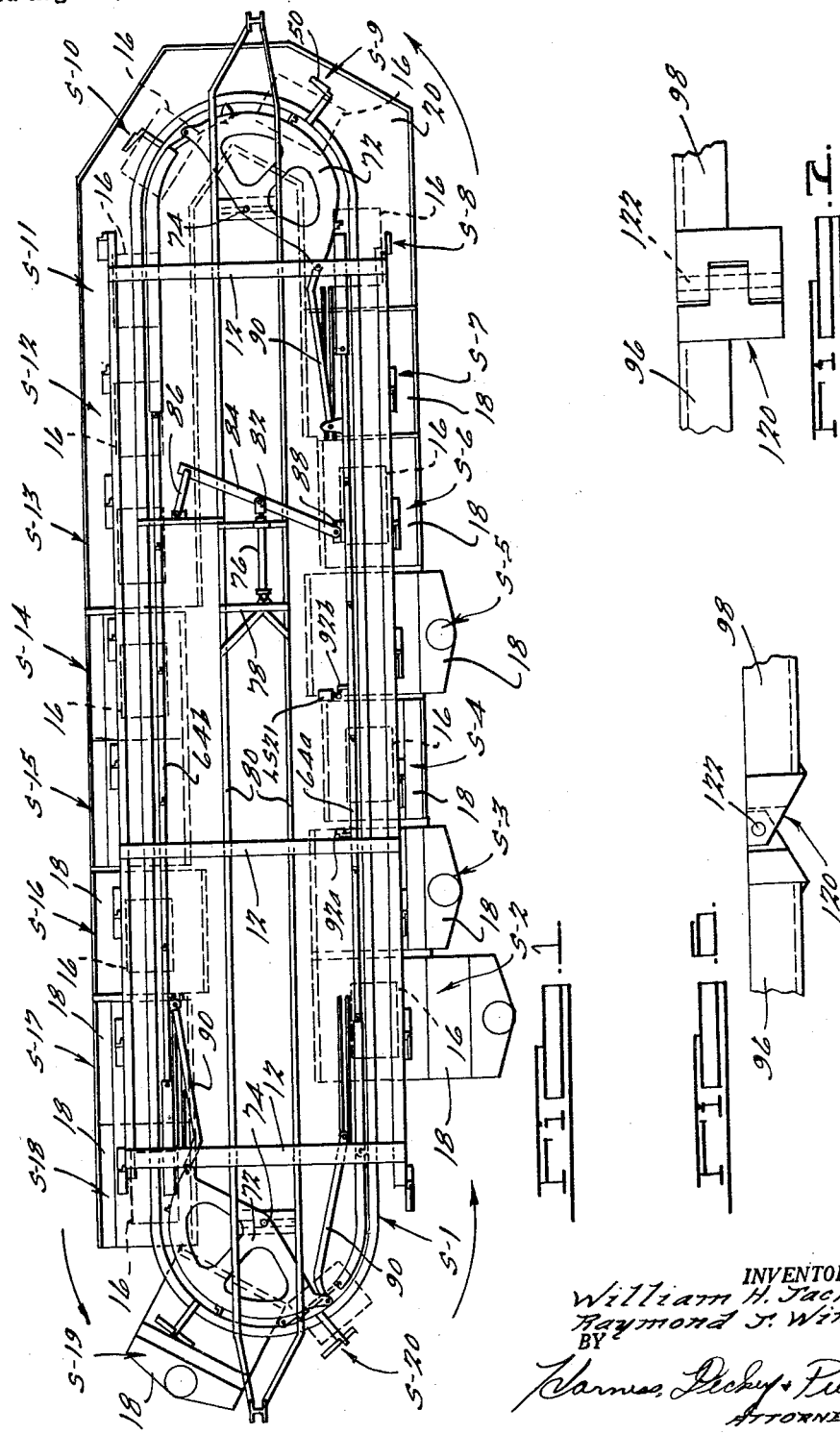
FIGURE 1 is a plan view of a typical conveying machine to which the present invention is applicable.

A typical conveying machine to which the variable transfer mechanism comprising the present invention is applicable as shown in FIGURE 1. The specific conveying machine shown is of the turnaround type and is fully disclosed in copending United State patent application Serial No. 788,885, filed January 26, 1959, now Patent No. 3,009,467, and assigned to the same assignee as the present invention.

The conveying machine as shown in the drawings and as fully described in detail in the aforementioned patent application is comprised of a central frame including a series of upright columns 10 mounted on a base frame (not shown) and rigidly affixed at their upper ends to a series of transverse cross members 12. An overhead monorail 14 comprising two straight side sections joined at each of their ends by arcuate turnaround sections is rigidly secured to the outer end portions of the cross members 12 and extends in a continuous loop above the treating stations of the conveying machine. A plurality of work carriers 16, such as shown in FIGURE 2, are movably mounted on the monorail 14 and are intermittently advanced therealong by a reciprocable transfer mechanism mounted longitudinally of the monorail 14.

In the specific conveying machine shown in the drawings and particularly in FIGURE 1, a total of twenty treating stations are provided generally designated at S–1 to S–20. The workpieces are loaded at the loading stations S–1 and are thereafter transferred in the direction of the arrows through a series of single station treating receptacles 18 located at stations S–2 to S–7 which comprise the preparation or cleaning phase of the treating process. At the completion of the cleaning phase the workpieces are immersed in the multiple station treating receptacle 20 comprising stations S–8 to S–13 and through which they are sequentially advanced. The treatment provided in the multiple station treating receptacle 20 can comprise any suitable treatment such as, for example, an electroplating operation of the workpieces. When the workpieces reach the last station S–13 of the multiple station treating receptacle 20 they are withdrawn therefrom and are transferred through an adjoining series of single station treating receptacles 18 comprising treating stations S–14 to S–19 which comprise the finishing phase of the treating sequence. At the completion of the entire treating sequence the workpieces are unloaded at the unloaded station S–20 adjacent to the load station S–1.

Figure 2:
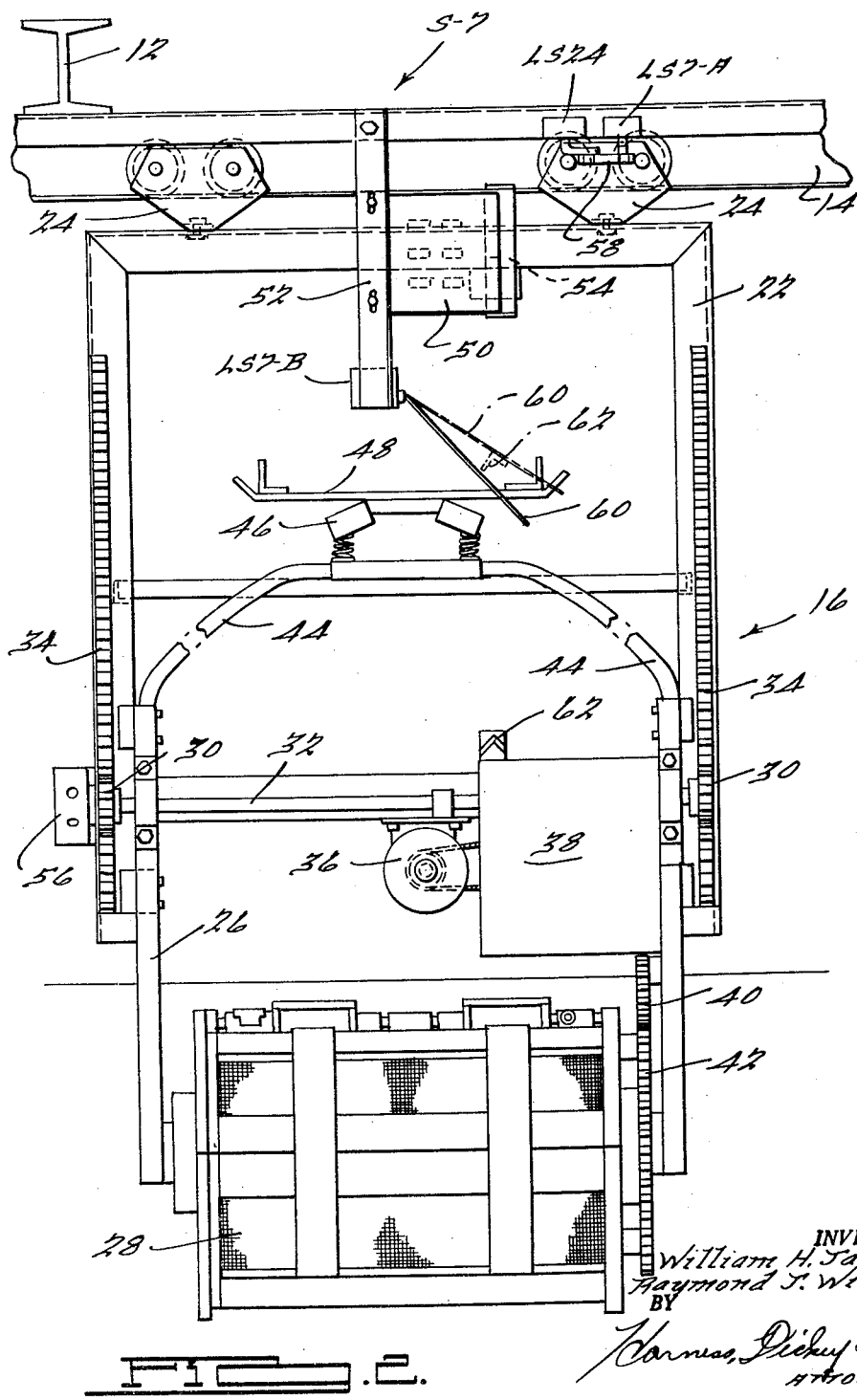
FIG. 2 is a front elevation view of a barrel type work carrier movably mounted on the conveying machine shown in FIGURE 1.

A typical work carrier 16 for carrying the workpieces through the foregoing treating sequence is shown in FIG. 2. The work carrier 16 is comprised of a supporting frame 22 of an inverted U-shaped configuration which is movably suspended on the monorail 14 by a pair of trolleys 24 rotatably affixed to the upper horizontal member thereof. A hanger frame 26 is mounted on the supporting frame 22 and is movable thereon to and from a raised position and a lowered position. A barrel container 28 is rotatably mounted at the lower end portion of the hanger frame 26 in which a plurality of workpieces are loaded and carried therein through the treating receptacles. The hanger frame 26 and the barrel container 28 thereon are moved to and from the raised position and the lowered position by means of the coaction between pinion gears 30 secured to the ends of a transverse shaft 32 and adapted to coact with a gear rack 34 affixed to each of the upright side portions of the supporting frame 22. Rotation of the transverse shaft 32 is achieved by a reversible power means including a reversible electric motor 36 which drives a suitable gear reducer and overrunning clutch assembly mounted beneath the shroud 38 and carried by the hanger frame 26.

The reversible power means on the work carrier 16 in addition to independently raising and lowering the hanger frame 26 is also operative to cause the barrel container 28 to rotate whereby the workpieces contained therein are caused to be tumbled at each treating station. Rotation of the barrel container 28 is accomplished by a driving gear 40 disposed in constant meshing engagement with a driven gear 42 mounted on the side of the barrel as shown in FIG. 2. At those treating stations at which an electro-chemical treating operation is to be performed, electrification of the workpieces contained in the barrel container 28 is achieved by a pair of conductors 44 extending downwardly along the side members of the hanger frame 26 and having the ends thereof projecting inwardly and contacting the workpieces contained in the barrel. The upper ends of the conductors 44 are electrically connected to a contact shoe 46 resiliently mounted on a rearward extending member of the supporting frame 22 and adapted to contact a cathode bar 48 which is secured to the central frame adjacent to the stations at which an electro-chemical treating operation is to be performed.

Energization of the reversible power means on each of the work carriers is accomplished by a stationary contactor 50 located at each treating station and supported outwardly of the monorail 14 by means of a hanger bracket 52 connected to the central frame. A movable contactor 54 is mounted on the horizontal portion of the supporting frame 22 of each work carrier and is adapted to be disposed in electrically connected relationship with the stationary contactor 50 when the work carrier is appropriately positioned at the treating station. Energization of the stationary contactors 50 is selectively accomplished by the central control system of the conveying machine as will be subsequently described in detail. Each work carrier 16 is also provided with a manual on-off switch 56 which provides for manual control of the reversible power means on each of the work carriers.

The electrical circuits for each of the work carriers 16 is schematically shown in FIG. 9. As shown therein the three-phase reversible electric motor 36 is connected to the contacts of the manual on-off switch 56 by conductors T1, T2 and T3. The contacts of the manual on-off switch 56 are connected to the contacts of the movable contactor 54 mounted on the supporting frame 22 by conductors L1, L2 and L3.

Movement of the work carriers 16 along the monorail 14 is signalled to the control system of the conveying machine by carriage signal limit switches LS1–A to LS20–A disposed at the treating stations S–1 to S–20, respectively. Actuation of the carriage signal limit switches is achieved by an actuator cam 58 mounted on the forward trolley 24 of each work carrier as shown in FIG. 2 and which cam trips the limit switch such as carriage signal limit switch LS7–A at treating station S–7 as the work carrier moves into the appropriate position above the single station treating receptacle. The actuation of the carriage signal limit switches LS1–A to LS20–A signals the control circuit of the conveying machine that each of the work carriers has attained the appropriate position whereby the next operating function of the conveying machine can commence.

Each station at which the hanger frame 26 and barrel container 28 supported thereon must be moved from the lowered position to the raised position in order that the barrel can be transferred over a partition separating adjoining treating receptacles, is provided with a barrel up signal limit switch LSX–B wherein the "X" comprises a numeral ranging from 1 to 20 corresponding with the treating station at which it is located. In the specific machine shown, barrel-up signal limit switches are provided at stations S–1 to S–7 and S–14 to S–20. The barrel-up signal limit switch LS7–B at station S–7 as shown in FIG. 2, is connected to the depending end portion of the hanger bracket 52 and is provided with a tripping arm 60 movable to and from an unactuated position shown in solid lines to an actuated position shown in phantom. Movement of the tripping arm 60 of the barrel-up signal limit switch LS7–B is achieved by an up position cam 62 affixed to and projecting from the hanger frame 26 of the work carrier and operative to move the tripping arm 60 from the unactuated position to the actuated position when the hanger frame and barrel container thereon attain the fully elevated position. The actuation of the barrel-up signal limit switches LS1–B to LS7–B and LS13–B to LS20–B signals the control circuit of the conveying machine that all of the work carriers have attained the fully raised position and can therefore be transferred over the partitions separating the adjoining treating receptacles. The treating stations S–8 to S–12 are not provided with barrel-up signal limit switches inasmuch as the barrel containers are not raised from a lowered to a raised position at these stations but instead remain in the lowered position as they are advanced along the multiple station treating receptacle 20.

Treating station S–7 adjacent to the multiple station treating receptacle 20 is preferably provided with a cycle safety limit switch LS24 disposed adjacent to the carrier signal limit switch LS7–A as shown in FIG. 2 and is adapted to be actuated by the cam 58 on the work carrier. It is the function of the limit switch LS24 to communicate to the control circuit as will be subsequently described in detail, to assure that the work carrier at station S–7 can be accommodated at station S–8. In the event a carrier is positioned at S–8, the control circuit can provide for either a stopping of the machine to enable the carrier at S–7 to be manually placed in its proper position, or alternatively, to assure that the carriers in the multiple station treating receptacle 20 are advanced to vacate station S–8 to receive the work carrier at station S–7. In this latter instance, the control circuit in response to actuation of limit switch LS24 overrides the trip mechanism assuring that it does not disenable the pushers along the receptacle 20 whereby the work carriers along the entire machine are advanced in unison to the next adjoining station.

The work carriers 16 are intermittently advanced along the monorail 14 by a transfer mechanism comprising a pair of pusher bars 64a, 64b of a T-shaped cross section which are slidably supported along the straight side portions of the conveying machine longitudinally of and inwardly spaced from the monorail 14. As may be best seen in FIGURES 1 and 3 to 5, the pusher bars 64a, 64b are slidably supported and guided during their reciprocating travel in a series of guide shoes 66 affixed to the underside surface of the cross members 12. A series of pushers 68 are pivotally mounted at spaced intervals to the depending web of the pusher bars 64a, 64b and are adapted to engage an arm 70 secured to and projecting inwardly from the supporting frame 22 as may be best seen in FIG. 5. The pivotable mounting of the pushers 68, in addition to enabling their movement to an inoperative position by the disengaging or trip mechanism which will be subsequently described in detail, also enables the pushers to pivot upwardly and across the top of the arm 70 of the next successive work carrier during their retracting movement. Each of the pushers 68 incorporates a suitable stop means therein which is adapted to coact with the lower edge of the depending web of the pusher bars 64a, 64b preventing the pushers from pivoting during the advancing movement of the pusher bar.

Advancement of the work carriers along the arcuate turnaround sections of the monorail 14 at the ends of the machine is achieved by a sector plate 72 rotatably mounted on a vertical shaft 74 at substantially the center of curvature of each of the arcuate turnaround sections. The periphery of the sector plate is provided with a series of angularly spaced pushers 68 similar to those employed on the pusher bars 64a, 64b and which pushers are adapted to engage the arms 70 on the work carriers and advance the carriers along the arcuate monorail sections during the oscillating movement of the sector plate 72.

Reciprocation of the pusher bars 64a, 64b to and from an advanced position and a retracted position is achieved by a double acting fluid actuated transfer cylinder 76 which is pivotally mounted at its closed end to a cross brace 78 extending between and affixed to a pair of longitudinal frame members 80 of the central frame. A clevis type fitting 82 is mounted at the end of the piston rod of the transfer cylinder 76 and is pivotally connected to a lever arm 84 which is pivotally secured at one of its ends to the central frame by means of a link 86 and at the other end to the pusher bar 64a by an ear 88 rigidly secured to the pusher bar. Accordingly, as the piston rod of the transfer cylinder 76 moves to and from a retracted position to an advanced position, the pusher bar 64a connected thereto correspondingly undergoes a reciprocating travel to and from a retracted position and an advanced position. The reciprocating motion of the pusher bar 64a connected to the lever arm 84 is transferred to the sector plate 72 at the right end of the machine as viewed in FIGURE 1 by a link 90 whereby the sector plate is caused to oscillate to and from an advanced position and a retracted position in unison with the pusher bar 64a. Similarly, the sector plate 72 at the left end of the machine as viewed in FIGURE 1 and the pusher bar 64b at the opposite side of the machine are caused to oscillate and reciprocate, respectively, by the link arms 90 connected to and extending between the sector plate and pusher bars 64a, 64b as shown in FIGURE 1.

The reciprocating travel of the pusher bars and the oscillating movement of the sector plates is directionally controlled by a transfer directional signal limit switch LS21 mounted adjacent the pusher bar as shown in FIGURE 1 and adapted to be tripped by actuators 92a, 92b when the pusher bar attains the fully advanced and fully retracted positions, respectively. The transfer directional limit switch LS21 is interlocked in the control circuit of the conveying machine in accordance with the control circuit shown in FIGS. 10 to 12 and the hydraulic system as shown in FIG. 8 which will be subsequently described in detail in connection with the operating sequence of the conveying machine.

The trip mechanism comprising the present invention is shown in the drawings, particularly FIGS. 3 to 5, and is operative to pivot selected ones of the pushers 68 to the inoperative position during alternative advancing movements of the pusher bar. The actuation of the trip mechanism can occur at any desired frequency wherein the rate of transfer of the work carriers along those sections provided with the trip mechanism is one-half, one-third, one-fourth, etc., the normal rate of transfer of the work carriers along the other sections of the machine. It will also be appreciated by those skilled in the art that more than one trip mechanism can be incorporated in the conveying machine along different sections thereof whereby the rate of transfer of the work carriers can be varied to any desired rate along selected sections of the machine in accordance with the desired operating sequence of the conveying machine.

In the specific conveying machine shown in the drawings the trip mechanism is actuated on alternate advancing movements of the transfer mechanism whereby the work carriers along the multiple station treating receptacle 20 are advanced at one-half the rate that the work carriers are advanced along the single station treating receptacles 18. This operating sequence enables the work carriers to be advanced rapidly through the cleaning phase and finishing phase of the treating sequence and more slowly through the electro-chemical treating phase provided in the multiple station treat-receptacle 20. As will be noted in FIGURE 1, the work carriers 16 which are indicated in dotted lines, are disposed at alternate treating stations along the single station treating receptacles 18 and at each station of the multiple station treating receptacle 20 in order to allow for the differences in their rates of transfer around the conveying machine.

The trip mechanism is comprised of a trip bar 94 disposed longitudinally of and in parallel spaced relationship to the reciprocating path of travel of the pushers 68 on the pusher bar 64b and the pushers 68 on the sector plate 72. The trip bar 94 is comprised of a straight section 96 and an arcuate section 98 which are interconnected at their ends and extend above the multiple station treating receptable 20. The trip bar 94 is of an angle iron cross section and is rigidly affixed at spaced intervals to cam plates 100 along the straight side portion of the machine and arcuate cam plates 100a along the arcuate turn-around section of the machine. Each of the cam plates 100 and arcuate cam plates 100a are provided with an inclined slot 102 through which a pin 104 extends and is supported at the ends thereof by the upstanding legs of a cam bracket 106 in a manner as shown in FIG. 5. The pin 104 is preferably provided with a sleeve bearing 108 and thrust bearing 110 to minimize friction between the inclined slot 102 and the pin 104. Lubrication of the assembly can be achieved by a suitable grease fitting 112 provided at one end of the pin 104. The cam brackets 106 are supported in appropriate position by an L-shaped bracket 114 which is rigidly affixed to a support angle 116 which extends longitudinally of the pusher bar 64 in substantially parallel inwardly spaced relationship. The support angle 116 is rigidly secured at spaced intervals to the upright columns 10 by braces 118 as shown in FIG. 5.

The arcuate section 98 of the trip bar 94 and the straight section 96 are connected at their ends by a hinged connection 120 as may be best seen in FIGS. 6 and 7. The hinge type connection 120 is of a fork-type construction and utilizes a pivot pin 122 providing for relative pivoting motion of the straight section with respect to the arcuate section in a horizontal plane.

The straight section 96 and arcuate section 98 of the trip bar 94 is movable to and from a raised position and a lowered position by a double acting fluid actuated trip cylinder 124 having its closed end pivotally secured to the central frame and the end of its piston rod 126 pivotally secured to one of the cam plates 100 in a manner shown in FIG. 4. Actuation of the trip cylinder 124 causes the slots in each of the cam plates 100 and arcuate cam plates 100a to ride up the pins 104 causing the trip bar to simultaneously reciprocate and rise from the lowered position shown in solid lines in FIG. 4 to the raised position shown in phantom. The lowered position of the cam plates 100 and arcuate cam plates 100a is adjustably determined by a series of stop screws 128 having the ends of their shank portions extending upwardly between the upstanding legs of the cam brackets 106 and adapted to abut the lower edge of the cam plates as shown in FIG. 5. The raised position of the trip bar can be conveniently established by the maximum stroke of the trip cylinder 124 and the clevis fitting 130 adjustably secured to the end of the piston rod 126 thereof.

During the elevating movement of the trip bar 94 the horizontal flange portion thereof contacts the base of the pushers 68 positioned immediately above causing the pushers to pivot from an operative position as shown in solid lines in FIG. 4 to an inoperative position as shown in phantom. When the trip bar is in the raised position, the pushers 68 are maintained in the inoperative position during the advancing movement of the pusher bars and sector plates whereby the base portion of the pushers are disposed above and do not engage the engaging arms 70 on the work carriers 16. In accordance with this arrangement, the rate of transfer of the work carriers around the conveying machine can be varied at selected stations to any desired rate simply by positioning a tripping bar adjacent to the selected stations and actuating the trip mechanism at the proper frequency to achieve the desired reduced rate of transfer along those sections.

The reciprocating movement of the trip bar to and from the raised position and the lowered position is controlled by a trip directional signal limit switch LS22 which is disposed longitudinally of the trip bar 94 as shown diagrammatically in FIG. 8 and is adapted to be actuated by actuators 132a, 132b when the fully lowered position and the fully elevated position are attained, respectively. The actuation of the trip directional limit switch LS22 signals the control circuit and the hydraulic system of the conveying machine that the trip bar has attained the fully elevated or fully lowered position whereby the next operating function of the machine can commence. As a safety precaution, a trip safety limit switch LS23 is also disposed adjacent to the trip bar 94 as shown in FIG. 8 and is adapted to be actuated by actuators 134a, 134b affixed to the trip bar to assure that the trip bar remains in the raised position during the advancing movement of the pusher bar. This precaution is advisable in the event any leakage of actuating fluid around the piston of the trip cylinder 124 should occur causing the piston rod 126 thereof to slowly retract whereby the trip bar moves downwardly from the fully raised position. When this occurs, the limit switch LS23 is released by the actuator 134a enabling the switch to assume its intermediate position which signals the control circuit of the conveying machine to stop the advancing movement of the pusher bars until the trip bar can again be raised to the fully elevated position.

The supply of a pressurized hydraulic fluid to the transfer cylinder 76 and the trip cylinder 124 is provided by the hydraulic system diagrammatically shown in FIG. 8. A pump motor 135 is drivingly connected to a pump 136 having a strainer 138 connected to the inlet conduit thereof which is submerged in a fluid reservoir 140'. The hydraulic system is provided with a relief valve 140 and a vent valve 142 including vent solenoid J1A assuring a constant preselected pressure in the system. The pressurized hydraulic fluid is selectively directed to the closed end and the rod end of the transfer cylinder 76 by a solenoid actuated transfer valve 144 including forward solenoid KA and return solenoid KB which are actuated in response to signals received from the central control circuit. Similarly, the pressurized hydraulic fluid is selectively directed to the closed end and the rod end of the trip cylinder 124 by a solenoid actuated resiliently biased trip valve 146 including up solenoid J2A which is actuable in response to signals received from the central control circuit.

Figure 11:
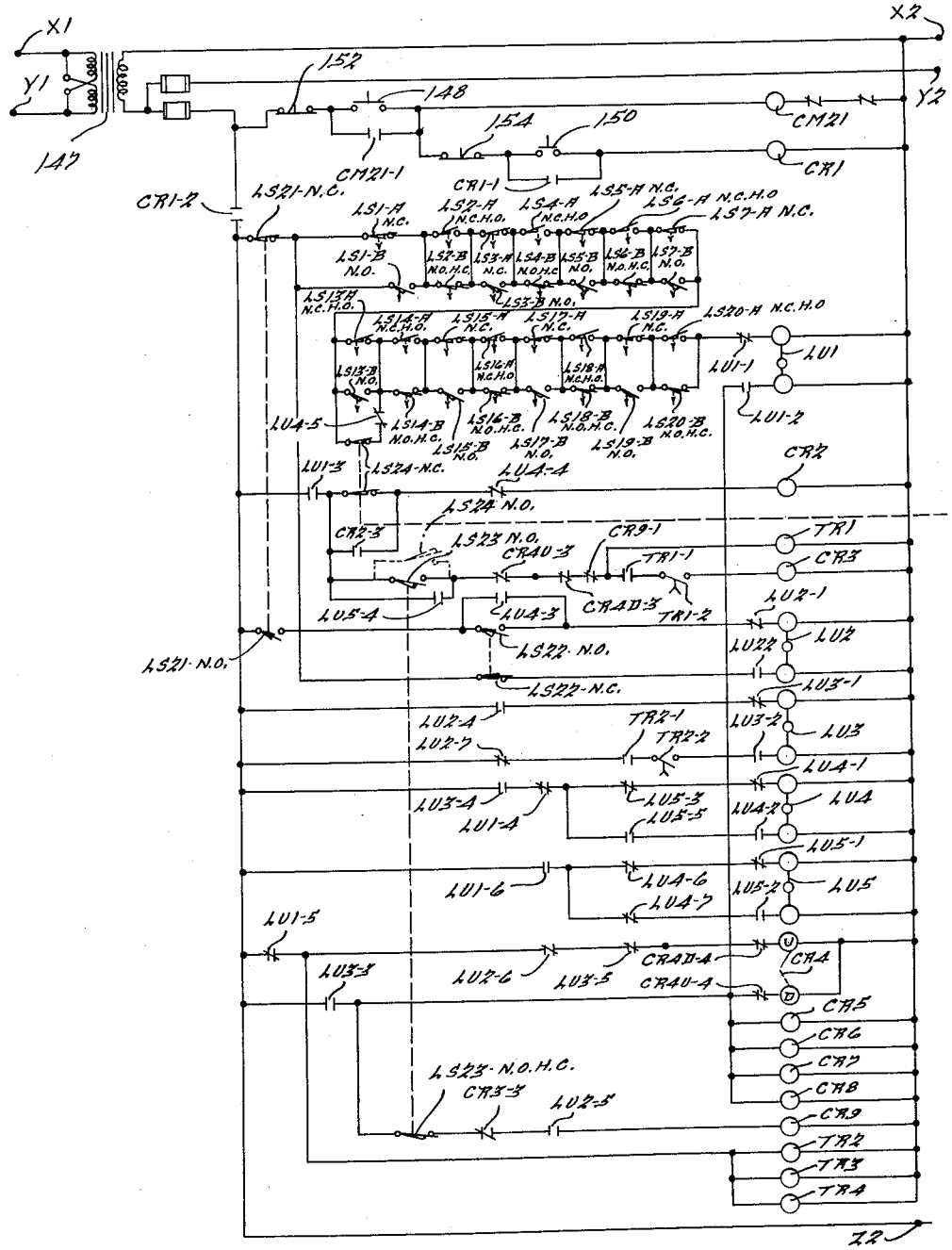

The operating sequence of the specific conveying machine herein shown and described can be best achieved with reference to FIGURES 1, 2, and 8 to 12. The wiring diagrams shown in FIGS. 10 to 12 comprise a single circuit wherein the wiring diagram of FIG. 10 is electrically connected to the wiring diagram of FIG. 11 at junctions X1—X1, and Y1—Y1, respectively, and the wiring diagrams of FIGS. 11 and 12 are electrically connected to each other by junctions X2—X2, Y2—Y2 and Z2—Z2, respectively. To facilitate identification of the components of the circuit shown in the drawings, motor control relays are designated as CM; control relays are designated as CR; latch relays are designated as LU; and the contacts of the limit switches designated LS are provided with the suffix N.C. for a normally closed contact, N.O. for a normally open contact, N.O.H.C. for a normally open held closed contact, and N.C.H.O for a normally closed held open contact The operating cycle will be described commencing with the position wherein the work carriers 16 and the barrel containers 28 thereon are in the fully raised position at treating stations S2, S4, S6, S14, S16, S18, and S20 and fully lowered at stations S8 to S13. In this position the carrier signal limit switches LS2A, LS4A, LS6A, LS8A, to LS14A, LS16A, LS18A and LS20A are actuated by the actuator cam 58 on the work carriers. Additionally the barrel-up signal limit switches LS2B, LS4B, LS6B, LS14B, LS16B, LS18B and LS20B are actuated by the up position cam 62 on the hanger frame 26 of the work carriers at those stations. The transfer cylinder 76 and pusher mechanism are in the fully retracted position and the trip cylinder 124 is in the fully retracted position whereby the trip mechanism is in the lowered position. Accordingly, transfer directional limit switch LS21 is actuated by actuator 92b, trip directional limit switch LS22 is actuated by actuator 132b, and the trip safety limit switch LS23 is operated by actuator 134b.

The machine is energized by closing the main disconnect switch 146 which energizes the control transformer 147 supplying current to the control circuit. Push button starts switch 148 is depressed energizing motor control relay CM21 which closes its holding contact CM21-1 enabling start switch 148 to be released and energizing the hydraulic pump motor 135 through contacts CM21-2 whereby the flow of fluid commences in the hydraulic system. The control circuit push button starter switch 150 is next depressed energizing control relay CR1 which closes its holding contact CR1-1 enabling the start push button 150 to be released and closes contact CR1-2 and CR1-3 energizing the control circuit of the machine. The hydraulic motor circuit and the machine control circuit are de-energized by depressing stop push button switches 152 and 154, respectively.

At the instant the machine control circuit is energized the latching coil of the barrel-up signal latch relay LU1 is energized through contacts LS1-A, LS2-B, LS3-A, LS4-B, LS5-A, LS6-B, LS7-A, LS24, LU4-5, LS14-B, LS15-A, LS16-B, LS17-A, LS18-B, LS19-A, LS20-B, and LU1-1. Energization of latch relay LU1 energizes the trip mechanism up signal control relay CR2 through normally closed contacts LS24, LU4-4 and LU1-3. When control relay CR2 is energized, it closes its contact CR2-1 which energizes the up solenoid J2A of the trip valve 146 (FIG. 8) and closes contact CR2-2 energizing the vent solenoid J1A of the vent valve 142 (FIGURE 8) whereby hydraulic fluid is pressurized and is directed into the closed end of the trip cylinder 124. As the trip bar commences its elevating movement, the trip safety limit switch LS23 is released by actuator 134b enabling it to move to its neutral position. When the trip bar attains the fully elevated position the trip directional limit switch LS-22 and the trip safety limit switch LS-23 are actuated by actuators 132a and 134a respectively. The closing of normally open contact LS23 energizes the drag-out dwell timer TR1 through contacts LU1-3, CR4U-3, CR4D-3, and CR9-1 and which closes timer contacts TR1-1 and commences to time a predetermined dwell period. At the completion of the dragout dwell time period, the timer TR1 closes its contact TR1-2 which energizes forward transfer control relay CR3 which closes its contact CR3-1 energizing the transfer forward solenoid KA of the transfer valve 144 (FIGURE 8) whereby pressurized hydraulic fluid is directed into the closed end of the transfer cylinder 76 and the transfer mechanism commences its advancing movement. With the trip mechanism in the raised position, the pusher adjacent to the work carriers in the multiple station treating receptacle 20 (stations S-8 to S-13) are in the inoperative position whereby the carriers at these stations are not advanced.

During the initial advancing movement of the pusher mechanism, the actuating cams 58 on the work carriers engaged by the pusher mechanism release carrier signal limit switches LS2-A, LS4-A, LS6-A, LS14-A, LS16-A, LS18-A, and LS20-A. The carrier signal limit switches at stations S-8 to S-13 remain actuated since the work carriers at these stations remain stationary. Additionally, barrel-up signal limit switches LS2B, LS4B, LS6B, LS14B, LS16B, LS18B, and LS20B are released to their normal positions as the up position cam 62 on the work carriers releases each of the tripping arms 60 of the barrel-up signal limit switches. Before the completion of the advancing movement of the transfer mechanism, the carrier signal limit switches and the barrel-up signal limit switches at the treating stations S-1, S-3, S-5, S-7, S-15, S-17, S-19 are operated. The cycle safety limit switch LS24 which is disposed at station S-7 is also actuated by the actuating cam 58 on the work carrier being advanced from station S-6 to station S-7. As hereinbefore mentioned it is the function of the cycle safety limit switch LS24 to assure that the work carrier at station S-8 will be transferred at the completion of the treating cycle to the next station (S-9) of the multiple station treating receptacle so that the work carrier at station S-7 can be accommodated at the first station (S-8) of the multiple station treating receptacle. The actuation of cycle safety limit switch LS24 causes its normally open contact to close energizing station S-13 motor control relay CM13 through contacts LS13-B and LS13-A.

At the completion of the forward stroke of the transfer mechanism the transfer directional limit switch LS21 is actuated by actuator 92a and closes its normally open contacts and energizes the latch coil of the trip and transfer repeater latch relay LU2 through contacts LS22 and LU2-1. Latch relay LU2 closes its contact LU2-3, maintaining the vent solenoid J1A energized. Latch relay LU2 also closes its contact LU2-4 energizing the latch coil of travel directional latch relay LU3 through LU3-1 contact and opens its normally closed contacts LU2-6, LU2-7, and LU2-1. Latching of the latch relay LU3 energizes the trip coil of the latch relay LU1 through contact LU3-3 unlatching the relay. In addition, the closing of contact LU3-3 also energizes down signal control relays CR5, CR6, CR7 and CR8. The closing of contact LU3-4 also energizes the latch coil of the plate tank skip transfer signal latch relay LU4 through contacts LU1-4, LU5-3, and LU4-1, which in turn opens its normally closed contacts LU4-1, LU4-4, LU4-5, LU4-6, LU4-7, and closes its normally open contacts LU4-2, LU4-3, and LU4-8. Contacts LU4-4 cause control relay CR2 to be de-energized. De-energization of control relay CR2 de-energizes the up solenoid J2A of trip valve 146 (FIGURE 8). Accordingly, the flow of hydraulic fluid to the trip cylinder is reversed, wherein it flows into the rod end of the cylinder and the trip bar commences its lowering movement. During the initial movement of the trip cylinder the trip safety limit switch LS23 is released by the actuator 134a to the neutral position. In addition, the closing of contact LU3-3 energizes the down coil of the line reversing control relay CR4 through CR4U-4 contacts which in turn closes its contacts CR4D-1, applying electrical energy to the stationary contactors 50 at the treating stations which require reversing power and opens its contacts CR4D-3 causing the dragout dwell timer TR1 and control relay CR3 to be de-energized. De-energization of control relay CR3, de-energizes the transfer forward solenoid KA through CR3-1 contacts.

The unlatching of latch relay LU1 causes normally closed contact LU1-5 to close whereby the down dwell timer TR2, the reduced barrel rotation timer TR3 for treating stations S-17, S-18 and S-19, and the delay dip timer TR4 for station S-16 are energized and commence to time their predetermined time periods. Timers TR2, TR3, and TR4 close their contacts TR2-1, TR3-1, and TR4-1, respectively.

Eenergization of control relays CR5, CR6, CR7, and CR8 energize motor control relays CM1, CM3, CM5, CM7, CM15, CM17, and CM19. In addition, the line reversing control relay CR4 through its contact CR4D-2 energizes motor control relays CM8 to CM12. Accordingly, reversing electrical energy is applied to each of the stationary contactors 50 whereby the three-phase reversible electric motor 36 of each of the work carriers causes the barrels at stations S-1, S-3, S-5, S-7, S-15, S-17 and S-19 to lower. The barrels at treating stations S-8 to S-13 which already are in the lowered position commence to rotate.

During the same interval the trip mechanism has moved to the fully lowered position wherein the trip directional limit switch LS22 and the trip safety limit switch LS23 have been actuated by actuators 132b and 134b, respectively. The transfer return signal control relay CR9 is energized through the normally open held closed contacts LS23 which in turn closes its contact CR9-2 energizing the transfer return solenoid KB of the transfer valve 144. Accordingly, the direction of the flow of hydraulic fluid to the transfer cylinder 76 is reversed whereby the fluid is now directed into the rod end of the transfer cylinder and the pusher mechanism commences its retracting movement. At the completion of the retracting movement of the transfer mechanism the transfer directional limit switch LS21 is actuated by the actuator 92b which energizes the trip coil of the latch relay LU2 through normally closed contact LS21, normally closed contact LS22 and contact LU2-2. The unlatching of latch relay LU2 causes its contact LU2-3 to open de-energizing the vent solenoid J1A and opens its contact LU2-5 de-energizing the control relay CR9 which in turn opens its contacts CR9-2 de-energizing the transfer return solenoid KB of the transfer valve.

During the lowering movement of the barrels at the treating stations S-1, S-3, S-5, S-7, S-15, S-17 and S-19, the barrel-up signal limit switches at these stations are released to their normal position. When the reduced barrel rotation timer TR3 times out the contact TR3-2 is opened which de-energizes motor control relays CM17 and CM19 which open their respective contacts CM17-1 and CM17-2 de-energizing the stationary contactors 50 at stations S-17 and S-19, respectively. Accordingly, the barrels on the work carriers at stations S-17 and S-19 stop rotating.

The barrel containers remain in the lowered position for a predetermined period as established by the down dwell timer TR2. At the expiration of the down dwell period, the down dwell timer TR2 closes its contact TR2-2 which energizes the trip coil of the latch relay LU3 causing it to unlatch and open its contact LU3-3 whereby the down coil of the line reversing control relay CR4 is de-energized and simultaneously de-energizes control relays CR5, CR6, CR7 and CR8. The motor control relays of stations S-8 to S-12 are de-energized by the opening of contact CR4D-2 removing electrical energy from the energized stationary contactors 50 at these stations. In addition, the opening of contacts CR4D-1 de-energizes the contactors at stations S-1, S-3, S-5, S-7, S-15. Simultaneously, the normally closed contact LU3-6 of the latch relay LU3 closes whereby the motor control relays CM17 and CM19 are energized and normally closed contact LU3-6 closes whereby the up coil of the control relay CR4 is energized closing its contacts CR4U-1 reversing the direction of rotation of the reversible electric motors 36. Control relay CR4 also closes its contact CR4U-2 closing the motor control relays at the stations S-8 to S-12. Accordingly, the reversible power means of the work carriers at stations S-1, S-3, S-5, S-7, S-13, S-15, S-17, and S-19 are energized causing the barrel containers to move upwardly out of the treating receptacles. Inasmuch as the power supplied to the stationary contactors at the treating stations S-8 to S-12 is not reversed, the barrels at these treating stations continue to rotate in the same direction while in the down position.

When the barrel containers of the work carriers at stations S-1, S-3, S-5, S-7, S-13, S-15, S-17 and S-19 attain the fully raised position the barrel-up signal limit switches at these stations are actuated by the up position cams 62 on the work carriers. As each barrel-up signal limit switch is actuated by the work carrier at that station, the motor control relay is de-energized by the opening of the respective contacts whereby electrical power is removed from the stationary contactor at that station. The latching coil of the latch relay LU1 is energized through the closed contacts of the actuated barrel-up signal limit switches in addition to the carriage signal limit switches at stations S-2, S-4, S-6, S-14, S-16, S-18 and S-20.

The latching of barrel-up signal latch relay LU1 causes its contact LU1-5 to open whereby the up-coil of line reversing control relay CR4 is de-energized opening its contacts CR4U-1 and CR4U-2 which in turn de-energizes motor control relays CM8, CM9, CM10, CM11 and CM12 whereby power is removed from the stationary contactors 50 at the treating stations S-8 to S-12, respectively, and the barrel containers at these stations stop rotating. In addition, latch relay LU1 closes its contact LU1-6 energizing the latching coil of the plating receptacle skip transfer reset latch relay LU5 and energizing the dragout dwell timer TR1 through contacts CR4U-3, CR4D-3, CR9-1, and LU5-4 which in turn closes its contact TR1-1. The dragout dwell timer TR1 commences to time a predetermined dwell period at the expiration of which contact TR1-2 is closed energizing transfer forward control relay CR3 which closes its contacts CR3-1 and CR3-2 energizing the transfer forward solenoid KA of the transfer valve 144 and the vent solenoid J1A of the vent valve 142, respectively. Accordingly, hydraulic fluid is directed into the closed end of the transfer cylinder 76 and the pusher mechanism commences its advancing stroke. It will be noted that inasmuch as the trip mechanism has not been actuated during this cycle, all of the work carriers are advanced in unison to the next adjacent treating station.

During the initial advancing movement of the work carriers the carrier signal limit switches at each station having a work carrier, the barrel-up position signal limit switches at the treating stations wherein the barrel containers are in the raised position, and the cycle safety limit switch LS24 at treating station S-7 are released to their normal positions. Prior to the completion of the advancing stroke of the transfer mechanism the carriage signal limit switches are operated at treating stations S-2, S-4, S-6, S-8 to S-13, S-14, S-16, S-18 and S-20 by the actuator cams 58 on the work carriers. In addition, the barrel-up signal limit switches are actuated at stations S-2, S-4, S-6, S-8, S-14, S-16, S-18 and S-20. At the completion of the forward stroke of the transfer mechanism the transfer directional signal limit switch LS21 is actuated by actuator 92a which closes its normally open contact and energizes the latching coil of the latch relay LU2 through contacts LU4-3 and LU2-1. Latch relay LU2 closes its contact LU2-3 maintaining the vent solenoid J1A energized.

In addition, latch relay LU2 closes its contact LU2-4 energizing the latching coil of the latch relay LU3 which closes its contact LU3-3 energizing the tripping coil of the latch relay LU1 through contact LU1-2 causing it to become unlatched. Latch relay LU3 through its closed contact LU3-3 energizes down signal control relays CR5, CR6, CR7, and CR8 and through its contact LU3-4 and contacts LU1-4, LU5-5, and LU4-2 energizes the tripping coil of the latch relay LU4 causing it to become unlatched. Contact LU3-3 also causes energization of the down coil of the control relay CR4 whereby reversing electrical power is applied to the contacts of the motor control relays which require reversing power.

The opening of contacts CR4D-3 causes the drag-out dwell timer TR1 and control relay CR3 to be de-energized. De-energization of control relay CR3 de-energizes the transfer forward solenoid KA through CR3-1 contacts. The tripping of latch relay LU1 causes the closing of normally closed contact LU1-5 which energizes the down dwell timer TR2, the reduced barrel rotation timer TR3 for stations S-17 to S-19, and the delay dip timer TR4 of station S-16 which close their contacts TR2-1, TR3-1, and TR4-1, respectively. Normally closed contact CR3-3 energizes transfer return signal control relay CR9 which closes its contact CR9-2 energizing transfer return solenoid KB. Accordingly, the flow of hydraulic fluid is now directed into the rod end of the transfer cylinder 76 and the transfer mechanism commences its retracting stroke.

The energization of control relays CR5, CR6, CR7 and CR8 by latch relay LU3 causes motor control relay CM2 to close through contacts CR5–2 and LS2–A, motor control relay CM4 through contacts CR5–4 and LS4–A, motor control relay CM6 through contacts CR6–2 and LS6–A, motor control relay CM13 through contacts CR6–4 and LS13–A, motor control relay CM14 through contacts CR7–1 and LS14–A, motor control relay CM18 through contacts CR8–1, TR3–2 and LS18–A, and motor control relay CM20 through contacts CR8–3 and LS20–A. In addition, motor control relays CM8, CM9, CM10, CM11, and CM12, are energized through contact CR4D–2 and their respective normally open held closed carrier signal limit switch contacts. Accordingly, the work carriers having their barrel containers in the raised position commence their lowering movement whereby the workpieces in the barrel containers are lowered into the treating receptacle below. The barrel containers of the work carriers disposed at stations S–9 to S–13 which are already in the lowered position commence to rotate whereby the workpieces contained therein are tumbled in the treating solution.

By virtue of the delay dip timer TR4 the work carrier at the treating station S–16 is not lowered until a predetermined time period after the remaining carriers are lowered. The appropriate delay time period is established by the delay dip timer TR4 which, on completion of its timing period closes its contact TR4–2 which energizes the motor control relay CM16 through contacts CR7–3 and LS16–A supplying power to the stationary contactor at station S–16 whereby the barrel container is lowered a predetermined delay period into the treating receptacle.

At the completion of the retracting movement of the transfer mechanism, the transfer directional signal limit switch LS21 is actuated by the actuator 92b which closes its normally open contact LS21 energizing the latching coil of the latch relay LU2. The latch relay LU2 opens its contact LU2–3 de-energizing the vent solenoid J1A and de-energizes control relay CR9 through opening its contact LU2–5. Control relay CR9 when de-energized opens its contact CR9–2 which de-energizes transfer return solenoid KB of the transfer valve 144. The transfer valve 144 returns to its neutral position as shown in FIGURE 8.

During the descending movement of the barrel containers at stations S–2, S–4, S–6, S–14, S–16, S–18, and S–20, the barrel-up signal limit switches at these stations are released to their normal positions. The barrel container at station S–18 on attaining the lowered position continues to rotate until the reduced rotation timer TR3 times out opening its contact TR3–2 which de-energizes the motor control relay CM18 which opens its contacts CM18–1 removing power from the stationary contactor at station S–18. Accordingly, the barrel container at station S–18 stops rotating and remains in the lowered position while the remaining barrel containers continue to rotate.

At the completion of the predetermined treating period as established by the down dwell timer TR2, the down dwell timer closes its contact TR2–2 energizing the tripping coil of the latch relay LU3 causing it to become unlatched whereby its contact LU3–3 is opened de-energizing the down coil of control relay CR4 in addition to de-energizing control relays CR5, CR6, CR7 and CR8. Power is thereby removed from the energized contactors. At the same time latch relay LU3 through its normally closed contact LU3–5 energizes the up-coil of control relay CR4. Motor control relay CM8 through CM12 are de-energized on the opening of contact CR4D–2 and are re-energized on the closing contact CR4U–2. The motor control relay CM18 at station S–18 provided with reduced barrel rotation which had formerly been de-energized on the opening of contacts TR3–1 and TR3–2 of the reduced rotation timer TR3 are re-energized through normally closed contacts LU3–6 on the unlatching of latch relay LU3. Accordingly, on the energization of the up-coil of control relay CR4 the contacts CR4U–1 close, supplying power to the stationary contactors 50 at stations S–2, S–4, S–6, S–14, S–16, S–18 and S–20. Simultaneously, control relay CR4 closes its contact CR4U–2 causing the motor control relays CM8 to CM12 to become energized closing their respective motor control contacts whereby electrical power is again supplied to their stationary contactors and the barrels commence rotating in the same direction remaining in the lowered position. On the other hand, the other work carriers having the direction of rotation of their reversible motors 36 changed cause the barrel containers to commence their elevating movement upwardly out of the treating receptacles.

When the barrel containers at stations S–2, S–4, S–6, S–14, S–16, S–18, and S–20, attain the fully raised position the barrel-up signal limit switches at each of these stations are tripped by the up position cam 62 on the respective work carriers. Actuation of the barrel-up position limit switches causes their respective contacts to open whereby the motor control relays at these stations are de-energized opening their contacts and removing power from the stationary contactors 50 at these stations. The barrels remain in the raised position by virtue of a self-locking worm gear in the drive mechanism of the reversible motor means incorporated in each of the work carriers. When all of the barrel-up signal limit switches have been actuated the latching coil of the barrel-up signal latch relay LU1 is energized through the contacts of limit switches LS2–B, LS4–B, LS6–B, LS14–B, LS16–B, LS18–B, LS20–B, LS1–A, LS3–A, LS5–A, LS7–A, LS15–A, LS17–A, LS19–A and the normally closed contact of cycle safety limit switch LS24. In this position the machine has completed one full cycle in accordance with the cycle hereinabove described and is in position to repeat the cycle whereby the barrel containers and workpieces contained therein are advanced through the predetermined treating sequence.

In the specific control diagram herein shown and described the cycle safety limit switch LS24 assures proper operating sequence of the conveying machine. In the event a work carrier is advanced to station S–7 out of the normal sequence, the normally open contact LS24 is closed on actuation of the cycle safety limit switch causing the barrel container of the work carrier at the last station S–13 of the multiple station treating receptacle to move to the fully raised position. In addition, the actuation of the cycle safety limit switch LS24 causes its normally closed contacts to open whereby the operation of the machine is stopped when the barrel containers have attained the fully raised position. Suitable visual or audible signals can be incorporated in the control circuit to communicate this condition to the operator. The misplaced work carriers can thereafter be manually repositioned in the correct sequence and the operation of the machine will thereafter continue in accordance with the cycle hereinabove described.

An alternate satisfactory application of the cycle safety limit switch LS24 can be employed which, in lieu of stopping the machine because of a misplaced work carrier as set forth above, is effective to continue the automatic operation of the machine by overriding the control circiut and maintaining the trip mechanism in the inoperative position whereby all of the work carriers are advanced. Accordingly, the work carrier at the first station S–8 of the multiple station treating receptacle is advanced to station S–9 in order that the work carrier at station S–7 which is out of sequence can be accommodated at station S–8. After the misplaced work carrier has been advanced to station S–8 the conveying machine reverts to its original operating sequence in accordance with that hereinabove described. The net result of the continued automatic operation of the conveying machine is a slight reduction in the total treatment time of the workpieces in the multiple station treating receptacle. Inasmuch as the total treating time in the multiple station treating receptacle is not critical in many treating processes the slight reduction in the total treating time would not constitute an objectionable attribute of the overriding automatic treating cycle.

The foregoing overriding automatic operating sequence can be simply incorporated in the control circuit of the conveying machine by employing a cycle safety limit switch LS24 incorporating one additional normally open contact which is wired in parallel around the normally open contact LS23 of the trip safety limit switch LS23 as shown in phantom in FIG. 11. In addition, the normally opened contact of the trip directional signal limit switch LS22 is eliminated and the normally open contact LU4–3 disposed in parallel thereto as shown in FIG. 11 is replaced by a normally open contact of the transfer forward signal control relay CR3. The foregoing modifications to the control diagram are effective to provide for a continuous automatic operating sequence of the conveying machine in spite of a work carrier which has been inadvertently advanced out of sequence to station S–7.

As heretofore mentioned, the specific conveying machine herein shown and described is of the turnaround type. It will be appreciated by those skilled in the art that the trip mechanism comprising the present invention is equally applicable to conveying machines of the straight-through type wherein the work carriers are loaded at one end of the machine and are advanced therealong and unloaded at the other end of the machine. In addition, it is also contemplated within the scope of this invention that the trip mechanism herein shown and described is equally applicable to other transfer mechanism incorporating movable engaging means thereon such as, for example, a flexible drive chain having thereon a series of movable engaging fingers or pushers which are adapted to engage the work carriers and advance the work carriers during the intermittent advancing movement of the drive chain.

While it will be apparent that the preferred embodiments herein illustrated are well calculated to fulfil the objects above stated, it will be appreciated that the invention is susceptible to modification, variation and change without departing from the proper scope or fair meaning of the subjoined claims.

What is claimed is:

1. In a conveying machine including a frame having a rail connected thereto on which a plurality of work carriers are movably mounted and intermittently advanced therealong by a transfer mechanism including a series of pivotally mounted pushers adapted to engage the work carriers and pivotable to and from an engaging position and a nonengaging position, the improvement comprising a trip mechanism for pivoting selected ones of the pushers to the nonengaging position, said trip mechanism comprising a tripping bar extending longitudinally of a portion of the transfer mechanism and adjacent to selected ones of the pushers thereon, coacting cam means on said tripping bar and the frame for supporting said tripping bar and enabling movement thereof to and from an inoperative position and an operative position, reciprocable power means for moving said tripping bar to and from said inoperative position and said operative position on selected advancing movements of the transfer mechanism, said tripping bar when moved from said inoperative position to said operative position effective to pivot the selected pushers adjacent thereto to the nonengaging position whereby the work carriers are not engaged thereby and control means for coordinating the operating sequence of the transfer mechanism and said trip mechanism.

2. In a conveying machine for conveying work pieces through a series of treating stations, the combination comprising a frame, a rail on said frame, a plurality of work carriers movably mounted on said rail, a transfer mechanism disposed longitudinally of said rail including engaging means pivotally mounted thereon for engaging said work carriers during the advancing movement of said transfer mechanism, said engaging means pivotable to and from an engaging position and a nonengaging position, means for intermittently advancing said transfer mechanism, tripping means disposed adjacent to selected ones of the said engaging means for pivoting the selected ones of the said engaging means to the nonengaging position, said tripping means movable to and from an inoperative position and an operative position, means for moving said tripping means to and from said inoperative position and said operative position on selected advancing movements of said transfer mechanism, said tripping means when moved from said inoperative position to said operative position effective to pivot the selected ones of said engaging means to said nonengaging position whereby the said work carriers are not engaged therby.

3. In a conveying machine for conveying workpieces through a series of treating stations, the combination comprising a frame, a rail on said frame, a plurality of work carriers movably mounted on said rail, a reciprocable pusher bar disposed longitudinally of said rail, a series of pushers pivotally mounted on said pusher bar and pivotable to and from an engaging position and a nonengaging position, means for reciprocating said pusher bar whereby work carriers engaged by said pushers thereon are intermittently advanced along said rail, a tripping bar disposed longitudinally of a portion of said pusher bar adjacent to selected ones of said pushers thereon, coacting cam means on said tripping bar and said frame for supporting said tripping bar and enabling movement thereof to and from an inoperative position and an operative position, reciprocable power means for moving said tripping bar to and from said inoperative position and said operative position on selected advancing movements of said pusher bar, said tripping bar when moved from said inoperative position to said operative position effective to pivot the selected ones of the said pushers to the nonengaging position whereby the work carriers are not engaged thereby, and control means for coordinating the operating movement of said pusher bar and said tripping bar.

4. A conveying apparatus for successively conveying workpieces through a series of treating stations comprising rail means for concurrently supporting a plurality of work carriers having workpieces suspended therefrom over the treating stations, variable transfer means for intermittently advancing said work carriers at a variable rate successively along said rail means, a first portion of said variable transfer means operative to advance said work carriers adjacent thereto on each advancing movement of said variable transfer means, a second portion of said variable transfer means rendered inoperative on selected advancing movements of said variable transfer means whereby said work carriers adjacent to said second portion are not advanced during said selected advancing movements, and control means for coordinating the operating sequence of said conveying machine.

5. The conveying machine as described in claim 3 further characterized as including switch means mounted on said frame and disposed adjacent to the path of travel of said work carriers and positioned at the treating station preceding said portion along which said tripping bar extends, actuator means on said work carriers for actuating said switching means on advancement of said work carriers to a position adjacent thereto, said switching means electrically connected to said control means and operative on actuation to prevent energization of said reciprocable power means whereby said tripping bar is retained in said inoperative position.

6. The conveying machine as described in claim 3 further characterized as including switch means mounted on said frame and disposed adjacent to the path of travel of said work carriers and positioned at the treating station preceding said portion along which said tripping bar extends, actuator means on said work carriers for actuating said switch means on advancement of said carriers to a position adjacent thereto, said switching means electrically connected to said control means and operative on actuation by a work carrier positioned in improper sequence on said rail prior to said selected advancing movement of said pusher bar to deenergize said control circuit whereby said conveying machine is shut down.

References Cited in the file of this patent

UNITED STATES PATENTS

| | | |
|---|---|---|
| 2,612,847 | Burrows | Oct. 7, 1952 |
| 2,943,580 | Burrows | July 5, 1960 |
| 2,950,688 | King | Apr. 30, 1960 |